United States Patent [19]

Marechal

[11] Patent Number: 5,558,309
[45] Date of Patent: Sep. 24, 1996

[54] CONVERTIBLE STRUCTURE COMPRISING A PLURALITY OF ADJACENT SEATS AND OF VARIABLE SIZE ALONG A SLIDING AXIS

[75] Inventor: Robert R. L. Marechal, Paris, France

[73] Assignee: Societe Industrielle et Commerciale de Materiel Aeronautique, Issoudun, France

[21] Appl. No.: 358,004

[22] Filed: Dec. 16, 1994

[30] Foreign Application Priority Data

Dec. 17, 1993 [FR] France .................................. 93 15256

[51] Int. Cl.⁶ .................................................. F16M 13/00
[52] U.S. Cl. ................... 248/424; 244/118.5; 244/118.6; 244/122 AH; 248/172; 248/188.1; 297/232; 297/234
[58] Field of Search ............................... 248/188.1, 172, 248/670, 298.1, 424; 297/232, 233, 234, 235; 244/118.5, 118.6, 122 R, 122 AH

[56] References Cited

U.S. PATENT DOCUMENTS

| | | | |
|---|---|---|---|
| 3,743,351 | 7/1973 | Harris | 297/232 X |
| 3,893,729 | 7/1975 | Sherman et al. | 297/232 X |
| 4,881,702 | 11/1989 | Slettebak | 297/232 X |
| 5,104,065 | 4/1992 | Daharsh et al. | 297/232 X |
| 5,131,607 | 7/1992 | Arnold et al. | 297/232 X |
| 5,178,345 | 1/1993 | Peltola et al. | 297/232 X |
| 5,509,722 | 4/1996 | Beroth | 244/118.6 X |

*Primary Examiner*—Ramon O. Ramirez
*Assistant Examiner*—Michael J. Turgeon
*Attorney, Agent, or Firm*—Young & Thompson

[57] ABSTRACT

A structure comprising a plurality of adjacent seats for a public passenger vehicle, in particular an airliner, the structure being convertible and of variable size along a sliding axis (100), and comprising:

a fixed portion (2) comprising at least two transverse underframes (4) that are spaced apart from each other, fixed to the floor of the passenger cabin, and rigidly connected to one another by longitudinal underframe elements (5) having an axis that is generally parallel to the sliding axis;

at least one moving portion (3) that is movable relative to the fixed portion between two extreme positions, namely a maximum-size first position and a minimum-size second position, the moving portion (3) including an end transverse seat side member (6) rigidly associated with longitudinal support elements (7), and intermediate transverse seat side members (8) parallel to the end transverse seat side member (6) and associated with the longitudinal support elements (6), and serving to mount seat backs and arms; and locking elements for locking the moving portion (3) to the fixed portion (2) in each of the two extreme positions;

wherein each longitudinal underframe element (5) includes at least two sliding support elements (9) secured to the longitudinal underframe element (5) for sliding along an axis that is parallel to and distinct from the general axis of the associated longitudinal underframe element (5), with a longitudinal support element (7) of the moving portion (3) being slidably received therein and guided in translation along the sliding axis (100).

18 Claims, 3 Drawing Sheets

CONVERTIBLE STRUCTURE COMPRISING A PLURALITY OF ADJACENT SEATS AND OF VARIABLE SIZE ALONG A SLIDING AXIS

FIELD OF THE INVENTION

The invention relates to a convertible structure comprising a plurality of adjacent seats and that is of variable size along a sliding axis.

The invention relates in particular to such a structure intended for use in public passenger vehicles, and in particular airliners.

BACKGROUND OF THE INVENTION

At present, airlines need to be able to adapt the passenger cabin of a given aircraft as a function of occupancy rates in the various comfort and tariff classes.

Thus, between two consecutive flights, airlines frequently need to change tourist class seats for business class seats, for example, or vice versa. Various methods and devices are presently available for that purpose. The first method consists in removing the seats entirely and in replacing them with seats of a different size. Such changeovers take too long and cannot in general be performed by crew members. That type of changeover is generally performed by specialized personnel during overnight maintenance.

In order to improve productivity, airlines are now tending to reduce stopover times between two flights quite considerably, since the cost of an airplane on the ground severely degrades productivity.

U.S. Pat. No. 3,893,729 relates to a structure comprising a plurality of adjacent seats that are convertible between different comfort class sizes. That structure includes a support underframe carrying a plurality of adjacent seats. Each seat is independent from the others. Changing over to a higher comfort class consists in removing certain seats from each row (e.g. two seats from a row of eight), causing all of the remaining seats to slide along the support underframe, and adding an additional element to each of them for the purpose of increasing their width. The seats that have been removed are stored in the airplane's cargo hold. Such devices make it possible to perform maintenance operations more quickly and may even be performed by crew members. There nevertheless remains the need to put the seats that have been removed into the cargo hold and to bring out the additional elements needed for widening the remaining seats.

In addition, that type of device is convertible only and does not allow for the general size of the structure to be reduced on changing from eight adjacent seats to six wider seats.

EP-A-0 322 930, EP-A-0 433 664, EP-A-0 530 923, and EP-A-0 530 920 relate to structures comprising a plurality of adjacent seats suitable for public passenger vehicles, and combining convertibility with size reduction.

Those structures comprise a fixed portion comprising at least two transverse underframes that are spaced apart, fixed to the floor of the cabin, and connected rigidly to one another by longitudinal underframe elements having a general axis parallel to a sliding axis. The structure includes a moving portion comprising at least one tube that is coaxial with the longitudinal elements, slidably engaged with the longitudinal elements of the underframe, and carrying a plurality of adjacent rigid seat frames. The structure also includes a locking and release mechanism placed at one end of the first seat frame. Operation is as follows: by acting on the locking and release mechanism, the tube or tubes is/are allowed to slide in the longitudinal underframe elements, thereby providing a structure of a size that can be varied by moving the adjacent seat frames towards one another or away from one another. The convertibility function is achieved by sacrificing a seat onto which two arm rests are brought so that the two seats immediately adjacent thereto gain extra width.

Such a structure relies on a sliding coupling with tube engagement. The drawback of tube engagement is that it is difficult to maintain, and in particular to clean. Accumulated dust can cause tube-on-tube sliding to jam.

Another drawback comes from the fact that sliding takes place over a substantial fraction of the tubes. Consequently, the slightest deformation of one or other of the tubes, particularly the long-term effect of the repeated application of the weight of various occupants of the seats, tends to make axial sliding difficult.

SUMMARY OF THE INVENTION

The object of the present invention si to provide a structure comprising a plurality of adjacent seats, being of convertible type and of variable size, and mitigating the drawbacks mentioned above.

To this end, the invention provides a structure comprising a plurality of adjacent seats for a public passenger vehicle, in particular an airliner, the structure being convertible and of variable size along a sliding axis, and comprising: a fixed portion comprising at least two transverse underframes that are spaced apart from each other, fixed to the floor of the cabin, and rigidly connected to one another by longitudinal underframe elements having an axis that is generally parallel to the sliding axis; at least one moving portion that is slidably movable relative to the fixed portion between two extreme positions, namely a maximum-size first position and a minimum-size second position, said moving portion including an end transverse seat side member rigidly associated with longitudinal support elements, and intermediate transverse seat side members parallel to the end transverse seat side member and associated with the longitudinal support elements, and serving to mount seat backs and arms. The structure also includes locking means for locking the moving portion to the fixed portion in each of the two extreme positions.

According to the invention, each longitudinal underframe element includes at least two sliding support elements secured to the longitudinal underframe element for sliding along an axis that is parallel to and distinct from the general axis of the associated longitudinal underframe element, with a longitudinal support element of the moving portion being slidably received therein and guided in translation along the sliding axis. Such a structure relying on sliding by means of sliding support elements that are offset relative to the longitudinal elements of the underframe makes it possible to restrict the sliding zones considerably. That has the effect firstly of limiting the extent to which the sliding zones become dirtied, of providing easier access to said sliding zones, and of limiting jamming effects due to the sliding means deforming.

Another advantage of the present invention is based on the fact that the connection between the sliding support elements and the underframe longitudinal element can advantageously include a shock-absorbing device in addition to or in place of those that already exist conventionally on tranverse underframes.

BRIEF DESCRIPTION OF THE DRAWINGS

Other advantages appear from the following description) given with reference to the accompanying drawings, in which.

DETAILED DESCRIPTION OF THE INVENTION

Figure 1:
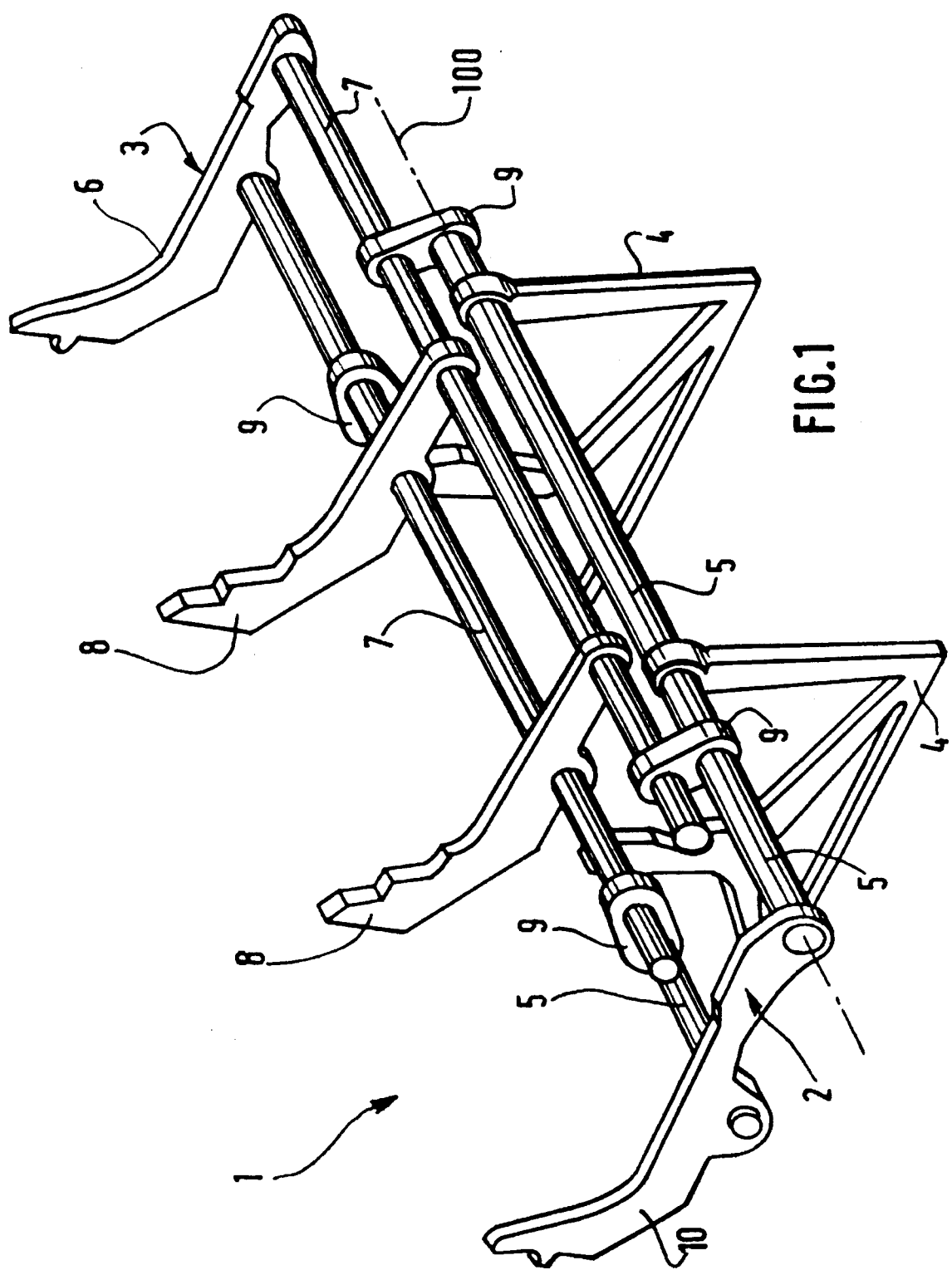
FIG. 1 is a three-quarters outside view of a structure of the present invention having one moving portion and shown in its minimum size position.

The invention relates to a structure 1 comprising a plurality of adjacent seats for public passenger vehicles, in particular airliners, which structure is convertible and of variable size along a sliding axis 100. In the description below, the terms "transverse", "axial", and "longitudinal" should be understood relative to the sliding axis 100.

The structure shown in the drawings and described in the present application relates to a variable-size structure having three adjacent seats.

By way of non-limiting example, the structure may serve to convert three tourist class seats into two higher-comfort class seats occupying a smaller amount of space overall. The structure can thus also serve to increase inter-seat spacing so as to limit passenger crowding.

This structure 1 comprises a fixed portion 2 and a moving portion 3.

In the embodiment shown in the figures, the fixed portion comprises at least two transverse underframes 4 that are spaced apart from each other and fixed to the floor of the passenger cabin of a public passenger vehicle, the underframes being rigidly connected together by longitudinal underframe elements 5 having an axis that extends generally parallel to the sliding axis 100.

Each longitudinal underframe element comprises at least two sliding support elements 9 secured to the longitudinal underframe element 5 having an axis parallel to and different from the general axis of the longitudinal underframe element 5 associated therewith.

A longitudinal support element 7 forming a part of the moving portion 3 is slidably received in the sliding support element 9 and is guided thereby in translation along the sliding axis 100.

The, or each, moving portion 3 further comprises an end transverse seat side member 6 rigidly associated with the longitudinal elements 7, and intermediate transverse seat side members 8 parallel to the end transverse seat side member 6 and associated with the longitudinal support elements 7.

The end transverse seat side members 6 and the intermediate transverse seat side members 8 are disposed so as to enable seat backs and seat arms to be mounted thereon.

The intermediate transverse seat side members 8 are slidable relative to the support elements 7 with which they are associated.

This characteristic is important insofar as it enables the frame of each seat to be compressed or expanded, which is not possible in the prior art since the frame elements of those seats are all rigidly associated in translation along the sliding axis.

Advantageously, the support elements 7 include drive abutments (not shown) disposed at predetermined locations for driving the intermediate transverse seat side members 8 in translation along the sliding axis 100 over a previously-chosen distance that may optionally be different from the distance through which the, or each, end transverse seat side member is caused to slide.

In a first embodiment of the invention, as shown in FIG. 1, one of the end transverse seat side members 6, given reference 10, is rigidly associated with the longitudinal underframe elements 5, with only one end seat side member 6 being movable. This configuration is particularly advantageous when the structure is positioned adjacent to a wall of the cabin of the public passenger vehicle.

Figure 2:
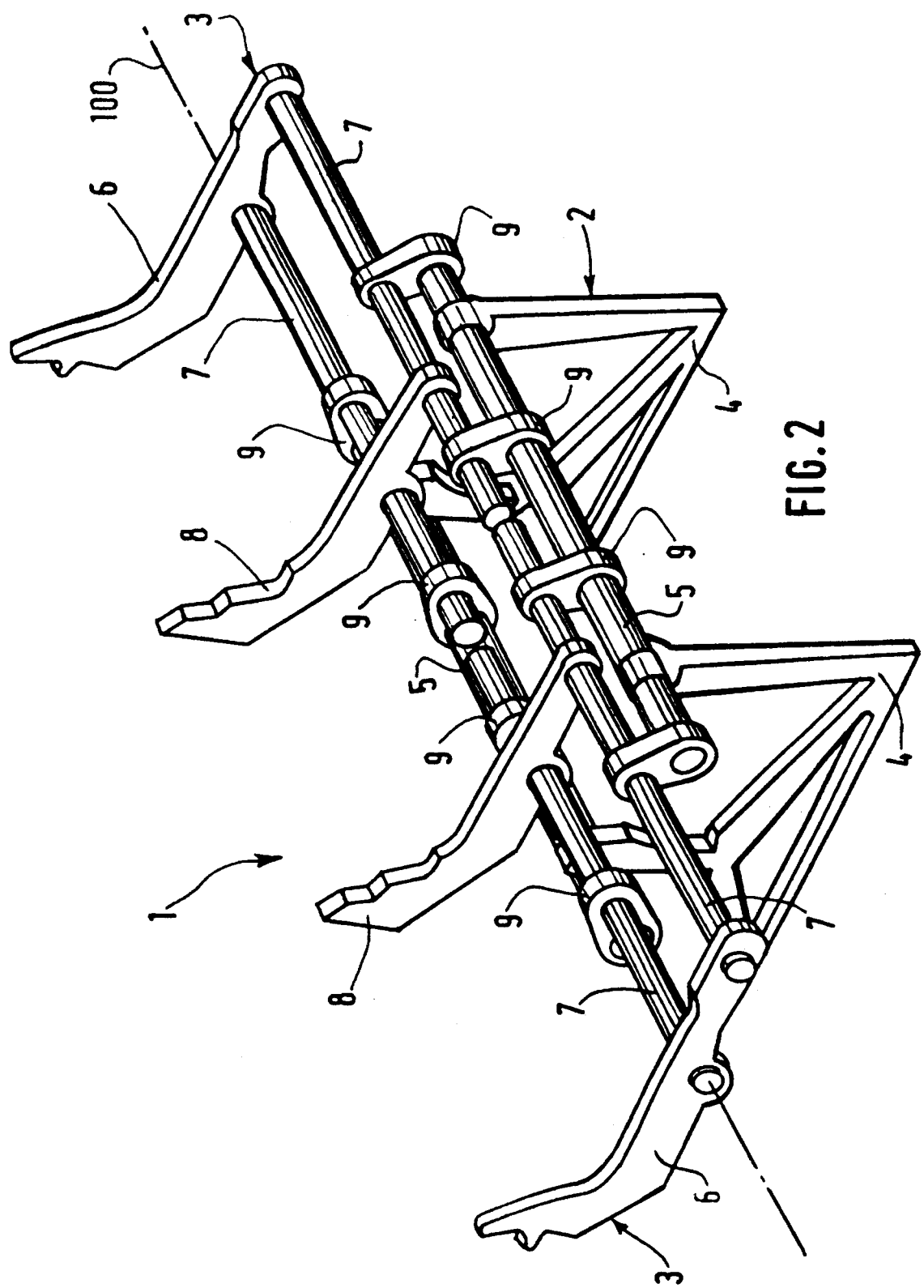
FIG. 2 is a three-quarters outside view of a structure of the present invention having two moving portions And shown in its minimum size position.

In a second embodiment shown in FIG. 2, each of the end transverse seat side members 6 is rigidly associated with a respective different moving portion 3. In this configuration, the two seat ends 6 are movable independently of each other.

The, or each, moving portion slides relative to the fixed portion 2 along the sliding axis 100 between two extreme positions, namely a first or "maximum size" position and a second or "minimum size" position (FIGS. 1 and 2).

The structure includes means for locking the moving portion(s) 3 to the fixed portion 2 in each of the two end positions.

Advantageously, the locking means include abutments (not shown) for limiting sliding motion between the two end positions, and safety means for locking the moving portion 3 in one or other of its two extreme positions.

The changeover from one of the extreme positions to the other is performed by means of a removable manual actuator device 18 that is made safe. Safety is provided by the manual actuator device 18 being retained by the structure so long as it has not been locked in translation.

Figure 3:
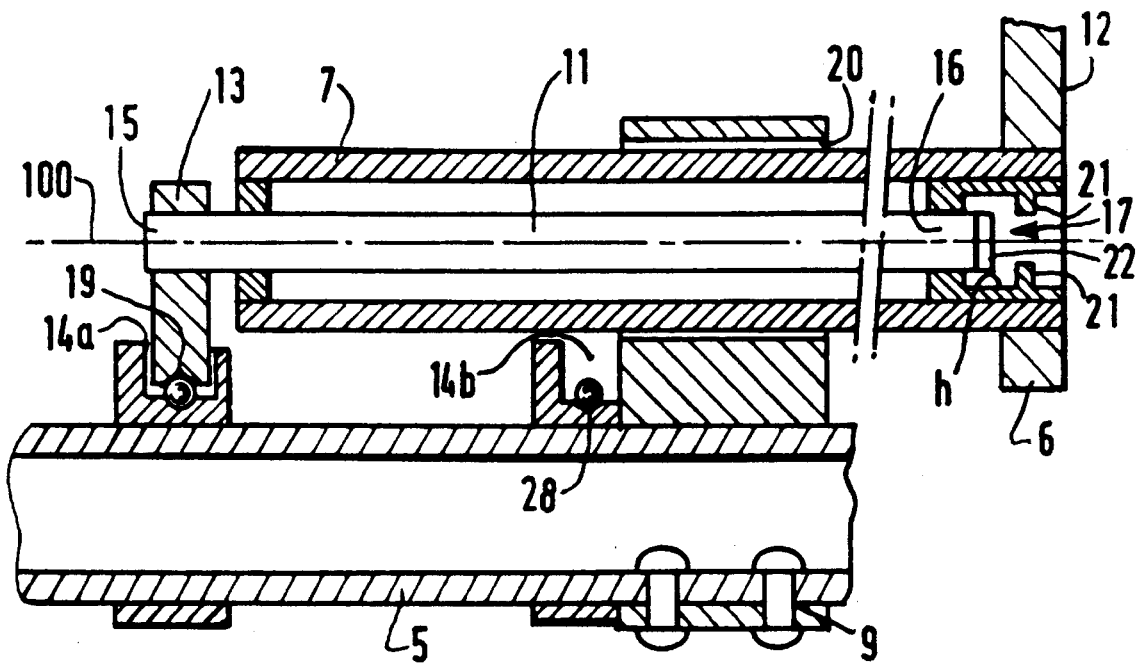
FIG. 3 fragmentary longitudinal section through an embodiment of the present invention.

In the embodiment shown in FIG. 3, the safety means for locking the moving portion in one of the extreme positions are disposed in part inside one of the longitudinal support elements 7. To this end, the longitudinal support element 7 is hollow.

In addition to the hollow longitudinal support element 7, the safety means for locking the moving portion 3 in one of its two end positions comprise a rod 11 mounted coaxially inside the hollow longitudinal support element 7, free to rotate about the axis of hollow support element, and opening out at one of its ends to the outside face 12 of the moving end transverse seat side member 6, while its other end has a cam 13. The cam 13 is designed to co-operate with two radial grooves 14a and 14b formed on the underframe element 5 associated with the hollow longitudinal support element 7 via the sliding supports 9, which are fitted with ball-bearing socket 20. The grooves 14a and 14b are disposed in such a manner that in the first position, the cam co-operates with the first groove 14b to lock the moving portion 3 against translation, while in the second position, the cam co-operates with the second groove 14a for achieving the same result.

Advantageously, the safety means for locking the moving portion 3 in one of the two extreme positions includes a system 28, 19 for complementary engagement in the groove 14a or 14b, such as a system comprising a ball 28 that co-operates with a cavity 19, by way of non-limiting example. The ball 28 and the cavity 19 can equally well be located at the end of the cam 13 and at the bottom of the groove 14a and 14b, or vice versa.

In addition, the rod 11 may be associated with a resilient element forcing it to return the cam 13 into a cam-engaged position.

Finally, the end 16 opening out in the outside face 12 of the end transverse seat side member 6 may advantageously include an axial safety lock 17 designed to co-operate with the removable manual actuator device 18 so as to enable rotary motion to be imparted to the rod 11 for the purpose of changing over from one position to the other.

Figure 4:
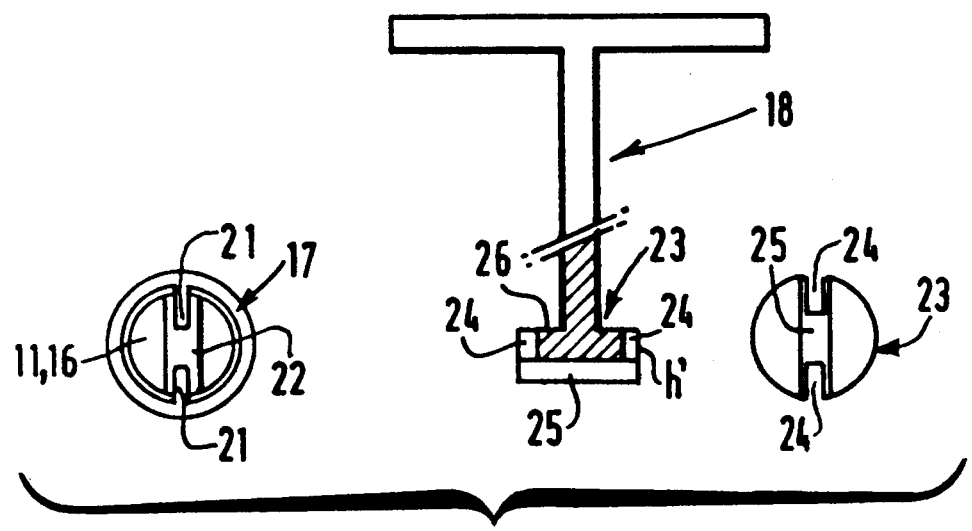
FIG. 4 is a front view of the axial lock, and a front view, partially in section, of the manual actuator device in an embodiment of the invention.

In the embodiment shown in FIG. 4, the axial safety lock 17 and the manual actuator device 18 co-operate with each other in such a manner that:

if the cam is initially wrongly positioned in the groove, the manual actuator device cannot be associated with the axial lock;

if the cam is initially properly positioned in one or other of the grooves, then the manual actuator device can be inserted into the axial lock, but can no longer be removed therefrom unless the cam is properly positioned in one or other of the grooves.

For this purpose, the axial lock 17 includes radial studs 21 secured to the end transverse seat side member 6, and a diametral projection 22 at the end 16 of the rod 11; the actuator device has two radial notches 24 at an end 23, with the axial length h' of the notches being no greater than the axial depth of the lock, and a diametral slot 25 designed to co-operate with the diametral projection 22.

The lock operates as follows:

When the cam 13 is not properly positioned in a groove, the radial notches 24 are not in register with the projections 21 so the face 26 of the device is locked by the projections 21 preventing the device from being withdrawn.

Thus, changeover from one of the positions to the other takes place as follows:

the manual actuator device 18 is inserted into the axial lock 17, thereby constraining the rod 11 to rotate with the manual actuator device 18;

the manual actuator device 18 is used to rotate the rod 11 and thus disengage the cam 13 from one of the grooves 14a or 14b;

the moving portion is slid towards its other position;

the rod 11 is rotated in the opposite direction to engage the cam 13 in the other groove 14a or 14b;

the manual actuator device 18 is withdrawn from the axial safety lock 19 providing the cam 13 is properly engaged in the groove.

Advantageously, the rigid connection between the sliding support 9 and the longitudinal elements of the underframe 5 can include respective energy absorbing devices in addition to or in place of the energy absorbing devices conventionally disposed on the transverse underframes 4.

I claim:

1. A structure comprising a plurality of adjacent seats for a public passenger vehicle, in particular an airliner, the structure being convertible and of variable size along a sliding axis (100), and comprising:

a fixed portion (2) comprising at least two transverse underframes (4) that are spaced apart from each other, fixed to the floor of the passenger cabin, and rigidly connected to one another by longitudinal underframe elements (5) having an axis that is generally parallel to the sliding axis;

at least one moving portion (3) that is movable relative to the fixed portion between two extreme positions, namely a maximum-size first position and a minimum-size second position, said moving portion (3) including an end transverse seat side member (6) rigidly associated with longitudinal support elements (7), and intermediate transverse seat side members (8) parallel to the end transverse seat side member (6) and associated with the longitudinal support elements (6), and serving to mount seat backs and arms; and locking means for locking the moving portion (3) to the fixed portion (2) in each of the two extreme positions;

wherein each longitudinal underframe element (5) includes at least two sliding supports (9) secured to the longitudinal underframe element (5) for sliding along an axis that is parallel to and distinct from the general axis of the associated longitudinal underframe element (5), with a longitudinal support element (7) of the moving portion (3) being slidably received therein and guided in translation along the sliding axis (100).

2. A structure according to claim 1, wherein the intermediate transverse seat side members (8) are slidable relative to the support elements (7) with which they are associated.

3. A structure according to claim 2, wherein the support elements (7) drives said intermediate transverse seat side members (8) in translation along the sliding axis (100) over a previously-chosen distance that is not necessarily the same as the displacement distance of the moving portion (3).

4. A structure according to claim 1, wherein the locking means comprises safety means for locking the moving portion (3) in each of the two extreme positions.

5. A structure according to claim 4, wherein at least one of the longitudinal support elements (7) of each moving portion (3) is hollow, and wherein the safety means comprises a rod (11) coaxially mounted inside the hollow support element (7), free to rotate about the axis of said support element, opening out to one of its ends (16) in an outside face (12) of the end transverse seat side member (6), and having a cam (13) at its other end (15), two grooves (14a, 14b) being provided in the associated underframe element (5) in such a manner that when the cam (13) is in the first position it co-operates with the first groove (14b) to lock the moving portion (3) in translation, and when the cam is in its second position it co-operates with the second groove (14a), changeover between the two positions being achieved firstly by rotating the rod (11) so as to disengage the cam from one of the grooves (14a, 14b); then by sliding the moving portion (3) towards the other position; and then by rotating the rod (11) in the opposite direction to engage the cam (13) in the other groove (14a, 14b).

6. A structure according to claim 5, wherein the end (16) opening out in the outside face (12) of the end transverse seat side member (6) has an axial safety lock (17) designed to co-operate with a removable manual actuator device (18) that enables rotary motion to be imparted to the rod (11) in order to pass from one position to the other, which device is prevented from being removed so long as the cam (13) is not correctly positioned in one or other of the grooves (14a, 14b).

7. A structure according to claims 6, wherein the cam (13) is properly positioned in one or other of the grooves (14a, 14b) by means of a system comprising a ball (28) that co-operates with a cavity (19), one of the ball and cavity being disposed in the bottom of the groove and the other at a radial end of the cam.

8. A structure according to claim 7, wherein the sliding supports (9) are fitted with ball-bearing sockets (20).

9. A structure according to claim 8, wherein the rod (11) is urged into a cam position that causes the cam (13) to be engaged in one or other of the grooves (14*a*, 14*b*).

10. A structure according to claim 4, wherein the safety means for locking the moving portion (3) in either extreme position comprises a manual actuator device that is made safe by being retained by the structure unless it has been properly locked in position against translation.

11. A structure according to claim 10, wherein at least one of the longitudinal support elements (7) of each moving portion (3) is hollow, and wherein the safety means comprise a rod (11) coaxially mounted inside the hollow support element (7), free to rotate about the axis of said support element, opening out to one its end (16) in the outside face (12) of an end transverse seat side member (6), and having a cam (13) at its other end (15), two grooves (14*a*, 14*b*) being provided in the associated underframe element (5) in such a manner that when the cam (13) is in the first position it co-operates with the first groove (14*b*) to lock the moving portion (3) in translation, and when the cam is in its second position it co-operates with the second groove (14*a*), changeover between the two positions being achieved firstly by rotating the rod (11) so as to disengage the cam from one of the grooves (14*a*, 14*b*); then by sliding the moving portion (3) towards the other position; and then by rotating the rod (11) in the opposite direction to engage the cam (13) in the other groove (14*a*, 14*b*).

12. A structure according to claim 11, wherein the end (16) opening out in the outside face (12) of the end transverse seat side member (6) has an axial safety lock (17) designed to co-operate with a removable manual actuator device (18) that enables rotary motion to be imparted to the rod (11) in order to pass from one position to the other, which device is prevented from being removed so long as the cam (13) is not correctly positioned in one or other of the grooves (14*a*, 14*b*).

13. A structure according to claim 12, wherein the cam (13) is properly positioned in one or other of the grooves (14*a*, 14*b*) by means of a system comprising a ball (28) that co-operates with a cavity (19), one of the ball and cavity being disposed in the bottom of the groove and the other at a radial end of the cam.

14. A structure according to claim 13, wherein the sliding supports (9) are fitted with ball-bearing sockets (20).

15. A structure according to claim 14, wherein that rod (11) is urged into a cam position that causes the cam (13) to be engaged in one or other of the grooves (14*a*, 14*b*).

16. A structure according to claim 1, wherein one of the end transverse seat side members (10) is rigidly associated with the longitudinal underframe elements (5) so that only one of the seat ends (6) is movable.

17. A structure according to claim 1, wherein each of the end transverse seat side members (6) is rigidly associated with a moving portion (3), each of the two seat ends (10) being movable independently of the other.

18. A structure according to claim 1, wherein the rigid connections between the sliding supports (9) and the longitudinal underframe elements (5) are constituted by links that absorb energy in the event of major acceleration due to an accidental collision of the public passenger vehicle.

* * * * *